May 31, 1949.  M. A. ADAMS  2,471,507
SALT SHAKER
Filed Sept. 20, 1946
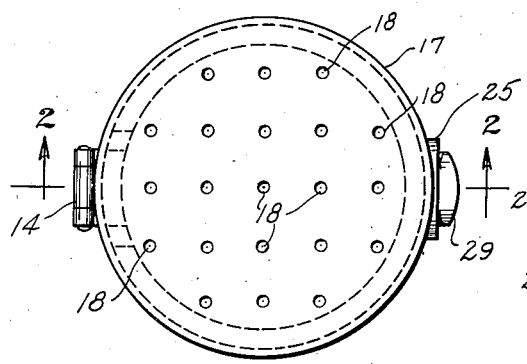
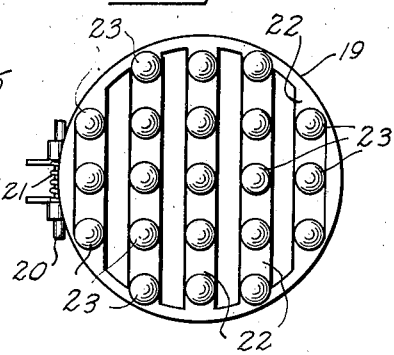
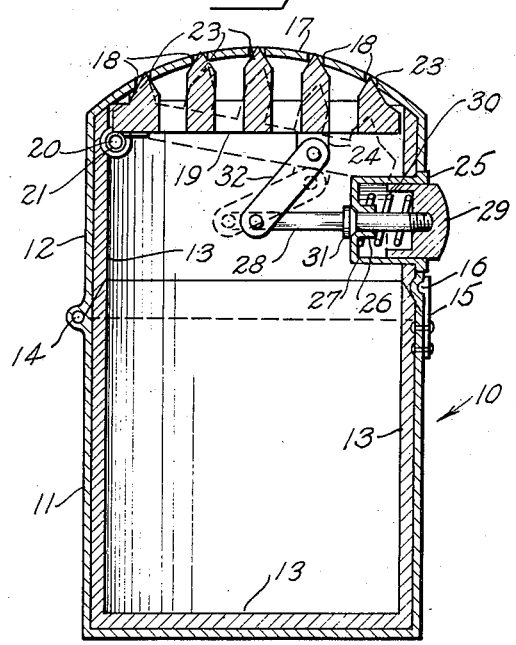
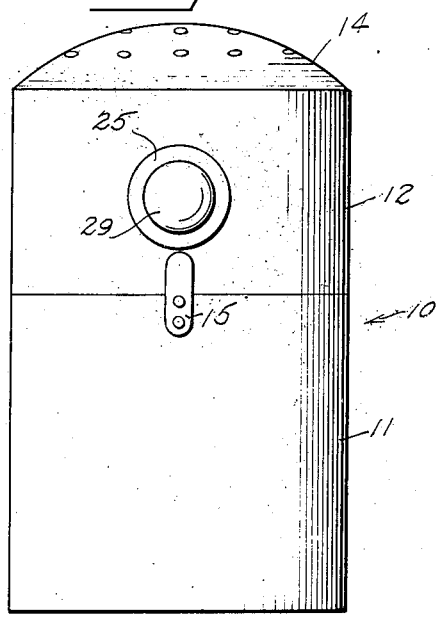
Inventor
Mozel A. Adams Patented May 31, 1949

2,471,507

UNITED STATES PATENT OFFICE 2,471,507

SALT SHAKER

Mozel A. Adams, Evangeline, La.

Application September 20, 1946, Serial No. 698,327

2 Claims. (Cl. 65—57)

My invention relates to salt shakers and more particularly to a salt shaker normally closed to exclude moisture and to prevent clogging of the holes in the top of the salt shaker.

The object of my invention is to provide a salt shaker having a spring biased grid located underneath the perforated top of the salt shaker and provided with tapered points extending upwardly and adapted to enter and close the holes in the salt shaker top under the pressure exerted by the spring, biasing the grid.

Another object of my invention is to provide a salt shaker of the character indicated above equipped with a push button under spring pressure adapted to swing the grid downwardly and thereby to remove the tapered pins from the holes in the shaker top, when pushed inwardly, and to release the grid into holes closing position when returned to normal position under the pressure of the spring affecting the push button.

Other objects of my invention may appear in the following specification describing my invention with reference to the accompanying drawing illustrating a preferred embodiment of my invention.

It is however to be understood, that my invention is not to be limited or restricted to the exact construction and combination of parts described in the specification and shown in the drawing, but that such changes and modifications can be made, which fall within the scope of the claims appended hereto.

In the drawing

Figure 1 is a top plan view of a salt shaker according to my invention.

Figure 2 is a sectional view taken on line 2—2 in Figure 1.

Figure 3 is a top plan detail view of a closure grid used in connection with the salt shaker according to my invention, and Figure 4 is a front elevational view of the salt shaker according to my invention.

Referring now in detail to the drawing the salt shaker forming the subject matter of my invention can be made from any suitable and preferred material, such as glass, metal, plastic and the like and can be given any desired and preferred form and shape.

It has a body indicated in the drawing in general by the index numeral 10 and consisting of a lower body portion 11 and an upper body portion 12. The two body portions are lined throughout with a layer of cork 13 or any other suitable material adapted to prevent the entrance of humidity into the salt shaker. The two body portions are connected with each other by a hinge 14 and the upper edges of the lower body portion 11 and its lining are beveled upwardly and inwardly and the lower edges of the upper body portion 12 and its lining are beveled downwardly and outwardly, so that the two body portions overlap and form a moisture proof junction.

Oppositely from the hinge 14 a spring catch 15 is fastened onto the lower body portion 11 and extends upwardly, so that it overlaps the lower edge of the upper body portion 12.

Adjacent the upper edge of the catch 15, which is preferably made from spring steel, a small ball 16 is formed adapted to engage a small indentation in the upper body portion 12, to hold the two body portions in closed position.

The upper portion 12 of the body 10 is closed on its upper end by an upwardly curved top 17 having a plurality of small holes 18 therein, preferably arranged in five rows extending either way across the top 17.

At a distance under the top 17 a circular grid 19 is arranged and hingedly fastened to the inside of the upper body portion on the same side of the body 10, on which the first named hinge 14 is located. The hinge pin 20 of the grid hinge is surrounded by a helical spring 21, which urges the circular grid 19 to swing upwardly. The grid 19 has so many grid bars 22 as there are rows of holes 18 in the salt shaker top and on each grid bar 22 so many upwardly extending tapered points 23 are provided as there are holes 18 in the row, under which the grid bar 22 is located. The tapered points 23 enter the holes 18 under the pressure of the spring 21 and close these holes tightly, to prevent access of moisture through said holes.

A lug 24 extends downwardly from the grid 19 for a purpose to be described later.

In the wall of the upper body portion 12 opposite to the hinge connection of the grid 19 and at a short distance above the lower edge of the upper body portion a small housing 25 is inserted and is open on its outward end. A hollow hub 26 is formed on the inner end wall of the housing 25 and extends inwardly in the housing.

The inner edge of the bore of the hub 26 is beveled as clearly shown at 27 in Figure 2.

A push rod 28 extends through the hollow hub 26 into the housing 25. On the end of the push rod 28 located in the housing 25 a push button 29 is threadedly mounted and a second helical spring 30 surrounds the hollow hub 26 and engages the push button 29 with one of its ends and the inner end wall of the housing 25 with its other end.

A beveled shoulder 31 is formed on the push rod 28 just outside of the housing 25, and the second helical spring 30 urges the beveled shoulder 31 into close engagement with the beveled end of the bore in the hub 26 to prevent moisture from entering into the salt shaker.

A link 32 is pivotally connected with the lower end of the lug 24 on the circular grid 19 and with the inner end of the push rod 28, so that the grid is swung downwardly, when the push rod 28 is forced inwardly by means of the push button 29, whereby the tapering points 23 are removed from the holes 18 in the salt shaker top 17 permitting salt to be sprinkled out of these holes.

The salt is first shaken through the openings between the grid bars 22 and then through the holes 18.

Normally the salt shaker described above is closed tightly everywhere, so that no moisture will enter into it and cause clogging of the salt shaker.

When the pressure on the push button 29 is released, the spring 30 forces the push button outwardly, whereby the push rod 28 is returned into normal position, pivoting the closure grid 19 upwardly by means of the link 32 and closing the holes 18 in the salt shaker top 17 with the taper points 23.

Having described my invention I claim as new and desire to secure by Letters Patent:

1. In a salt shaker comprising a hollow body portion with a top having a plurality of holes arranged in rows therein, a movable closure grid within the hollow body portion having a plurality of grid bars with upwardly-projecting tapered points fixed thereon and adapted to close said holes in raised position of the closure grid, the features including a hinge connection between the edge of the closure grid and the rear edge of the salt shaker, a horizontally-disposed push bar extending slidably through the front wall of the salt shaker, a spring biasing the closure grid upward upon the hinge connection into closed position, a downwardly-extending lug upon the bottom of said closure grid, a link pivotally connected at one end to the lug and at the other to the inner end of said push bar, there being a head or finger piece upon the outer end of the push bar, and a second spring urging said push bar outwardly with respect to the front wall of the shaker.

2. In a salt shaker comprising a hollow body portion with a top having a plurality of holes arranged in rows therein, a movable closure grid within the hollow body portion having a plurality of grid bars with upwardly-projecting tapered points fixed thereon and adapted to close said holes in raised position of the closure grid, the features including a hinge connection between the edge of the closure grid and the rear edge of the salt shaker, a horizontally-disposed push bar extending slidably through the front wall of the salt shaker, a spring biasing the closure grid upward upon the hinge connection into closed position, a downwardly-extending lug upon the bottom of said closure grid a predetermined short distance inward from the front wall of the salt shaker, the inner end of the push bar projecting a relatively greater distance inward from said front wall into the intermediate portion of said salt shaker, a rearwardly and downwardly-inclined link pivotally connected at the upper end to said lug and at the lower end to said inner end of the push bar, there being a recessed portion in said front wall of the shaker and a head or finger piece upon the outer end of said push bar located in said recessed portion, and a second spring mounted upon the push bar in said recessed portion within said head or finger piece.

MOZEL A. ADAMS.

REFERENCES CITED

The following references are of record in the file of this patent:

UNITED STATES PATENTS

| Number | Name | Date |
|---|---|---|
| 162,860 | Sheldon | May 4, 1875 |
| 836,748 | Gallisath | Nov. 27, 1906 |
| 847,726 | Brannon | Mar. 19, 1907 |
| 1,033,689 | Fuchs | July 23, 1912 |
| 1,040,991 | Avram | Oct. 15, 1912 |
| 1,110,398 | Moran | Sept. 15, 1914 |
| 1,161,489 | Long | Nov. 23, 1915 |
| 1,234,340 | Ishikawa | July 24, 1917 |
| 1,326,524 | Nierodka | Dec. 30, 1919 |
| 1,535,597 | Furda | Apr. 28, 1925 |
| 1,598,055 | Compton | Aug. 31, 1926 |
| 2,166,725 | Mandery | July 18, 1939 |